3,651,017
PROCESS FOR THE PREPARATION OF POLYESTERS
Kenichi Tanabe, Kazuo Itoi, and Hirozo Segawa, Kurashiki, Japan, assignors to Kurashiki Rayon Co., Ltd., Kurashiki, Japan
No Drawing. Filed Oct. 28, 1968, Ser. No. 771,360
Claims priority, application Japan, Dec. 29, 1967, 43/85,175
Int. Cl. C08g 17/015
U.S. Cl. 260—75 R      10 Claims

ABSTRACT OF THE DISCLOSURE

Process for the preparation of a polyester in which at least 80% of the recurring structural units are composed of ethylene terephthalate units, which comprises polycondensing bis($\beta$-hydroxyethyl)terephthalate, or a mixture of bis($\beta$-hydroxyethyl)terephthalate of the quantity sufficient to give at least 80% of ethylene terephthalate units to the product polyester, with the balance quantity of at least one comonomer which is copolycondensable with the terephthalate, in the presence of a polycondensation catalyst, characterized in that the polycondensation catalyst is composed of at least one germanium compound and at least one alkaline substance selected from the group consisting of alkali metals, and hydrides, hydroxides, oxides, alcoholates, and inorganic and organic acid salts of alkali metals.

---

This invention relates to a process for the preparation of polyesters. More particularly, the invention relates to a process for the preparation of polyesters in which at least 80% of the recurring structural units are ethylene terephthalate units, which comprises polycondensing bis ($\beta$-hydroxyethyl) terephthalate or a mixture of bis($\beta$-hydroxyethyl) terephthalate of the quantity sufficient to give at least 80% of ethylene terephthalate units to the product polyester, with the balance quantity of at least one comonomer which is copolycondensable with the terephthalate, in the presence of a polycondensation catalyst consisting of at least one germanium compound and at least one alkaline substance selected from the group consisting of alkali metals and hydrides, hydroxides, oxides, alcoholates, and inorganic and organic acid salts of alkali metals.

Utilities of polyester fibers have been recently developed in various branches of industries, because of the excellent properties of the fibers. Particularly, demands for high tenacity polyester have been increasing in the fields of industrial materials and clothing filaments. Normally preparation of high tenacity polyester is achieved by raising the degree of polymerization. For the synthesis of polyesters of higher degree of polymerization, use of antimony, titanium and tin compounds as the polycondensation catalyst has been proposed. However, use of such catalysts causes objectionable coloring of the product polymers, while they do achieve high rate of polycondensation. For example, when antimony compounds are used, the polymers tend to be colored ashen green, and with the use of titanium or tin compounds, the products are yellowed.

Presently one of the valuable polyesters in fiber industry is polyethylene terephthalate, and polyethylene terephthalate of high degree of polymerization is normally prepared by reacting terephthalic acid or a functional derivative thereof with ethylene glycol or a functional derivative thereof in the presence of an esterification or ester-interchange catalyst to form bis($\beta$-hydroxyethyl) terephthalate, and polycondensing the same to polyethylene terephthalate at a reduced pressure and elevated temperature, in the presence of a conventional polycondensation catalyst. As the polycondensation catalyst, numbers of metallic compounds have been proposed besides the above-named antimony, titanium and tin compounds. For example, U.S. Pat. No. 2,578,660 discloses the use of germanium dioxide for this purpose. Germanium dioxide catalyst is superior to antimony, titanium and tin compounds in that the whereby polycondensed polyesters exhibit excellent whiteness. However, since normally germanium dioxide is crystallized and extremely hard-soluble in ethylene glycol, bis($\beta$-hydroxyethyl) terephthalate or polymers thereof, germanium dioxide added to the system before or after the ester-interchange reaction fails to be uniformly dissolved into the reaction mixture under the conventional reaction conditions presently employed on industrial scales. As the result, the polycondensation efficiency is impaired. Increase of the catalyst quantity in the purpose of achieving better polycondensation efficiency neither accomplishes the corresponding result, due to the poor solubility of the catalyst in the reaction system. Separately, Japanese Official Patent Gazette, Publication No. 12,547/62 discloses that the germanium compound which is soluble in ethylene glycol or in the reaction mixture is useful as the polycondensation catalyst. Furthermore, Dutch Pat. No. 6511264 proposes the use of soluble and amorphous germanium dioxide as the polycondensation catalyst, and British Pat. No. 911,-245, use of soluble germanium alkoxides, such as germanium tetraethoxide. Those soluble germanium compounds similarly provide polyethylene terephthalate of excellent whiteness. However, the rate of polycondensation whereby achievable is less than the case of using antimony, titanium and tin compounds. Thus, for the synthesis of high polymerization degree polyesters exhibiting intrinsic viscosities of at least 0.7 as measured by the later-specified method, larger quantities of the catalyst are required, which apt to become the cause of coloration of the product. Furthermore, the catalyst is costly, particularly in comparison with crystalline germanium dioxide, which is an industrial disadvantage.

Also generally in the synthesis of high polymerization degree polyesters by polycondensation of bis($\beta$-hydroxyethyl)-terephthalate, diethylene glycol units tend to be formed upon thermal decompositon of main chains, dehydration condensation of hydroxyethyl terminals, etc. The diethylene glycol units enter into the product polymer chains to lower the softening point of the polyester. Particularly when germanium compounds are used as the polycondensation catalyst, the diethylene glycol unit content of the polyester is greater than the cases of using antimony or titanium compounds as the catalyst.

Accordingly, therefore, the primary object of the invention is to provide a process for economical preparation of high quality polyesters of high degree of polymerization.

Another object of the invention is to provide a process for the preparation of high quality polyesters of high degrees of polymerization within short period, by increasing the rate of synthesizing reaction, particularly that of the polycondensation reaction, with the use of germanium compounds as the polycondensation catalyst.

Still another object of the invention is to provide a process for the preparation of polyesters of high degrees of polymerization, which are useful as the materials for coloration- and turbidity-free, transparent fibers, films and other shaped products.

A further object of the invention is to provide a process for the preparation of polyesters in which the entrance of the diethylene glycol units, which are formed by thermal decomposition of main chains, dehydration condensation of hydroxyethyl terminals, etc., into the polymer chains is kept to the minimum.

A further object of the invention is to provide a process for economical preparation of high quality polyesters of high degree of polymerization, with the use of cheap crystalline germanium dioxide as the polycondensation catalyst.

An additional object of the invention is to provide a process for the preparation of glycol solutions of crystalline germanium dioxide.

Still other objects and advantages of the invention will become apparent from the following descriptions.

The foregoing and other objects of the invention can be accomplished by the process for the preparation of polyester of which at least 80% of the recurring structural units are ethylene terephthalate units, which comprises polycondensing bis($\beta$-hydroxyethyl)terephthalate or a mixture of bis($\beta$-hydroxyethyl)terephthalate of the quantity sufficient to give at least 80% of ethylene terephthalate units to the product polyester, with the balance quantity of a comonomer which is copolycondensable with the terephthalate, in the presence of a polycondensation catalyst consisting of at least one germanium compound and at least one alkaline substance selected from the group consisting of alkali metals, and hydrides, hydroxides, oxides, alcoholates, and inorganic and organic acid salts of alkali metals.

The process of the invention is practiced by polycondensing bis($\beta$-hydroxyethyl)terephthalate or a mixture of bis($\beta$-hydroxyethyl)terephthalate of the quantity sufficient to give at least 80% of ethylene terephthalate units to the product polyester, with the balance quantity of at least one comonomer which is copolycondensable with the terephthalate, in the presence of a specified polycondensation catalyst, at temperatures, ranging 230–300° C., preferably 250–300° C., and the pressures no higher than 20 mm. Hg., preferably not higher than 1 mm. Hg, while removing ethylene glycol, until the product attains a fiber-formable degree of polymerization, i.e., until generally the ($\eta$) reaches the order of 0.4–2, in a batch-type or continuous-type apparatus.

Bis($\beta$-hydroxyethyl)terephthalate used as the starting material is normally prepared from esterification or ester-interchange reaction between terephthalic acid or a functional derivative thereof, such as dimethyl terephthalate, and ethylene glycol or a functional derivative thereof, such as ethylene oxide. For example, it can be prepared by reacting dimethyl terephthalate with ethylene glycol in the presence of an ester-interchange catalyst, at pressure ranging from atmospheric to 5 kg./cm.² g., and temperatures ranging from 150–250° C., while distilling off the freed methanol, until the formation of free methanol ceases completely. Esterification or ester-interchange catalysts normally employed in the above reaction include compounds of lithium, sodium, potassium, calcium, strontium, barium, zinc, cadmium, aluminium, cerium, tin, lead, iron, manganese, cobalt, etc. They are used in the quantity of 0.005–1 wt. percent based on the terephthalic acid component.

The allowable quantity of the comonomer which is copolycondensable with bis($\beta$-hydroxyethyl)terephthalate is, at the maximum, 20%. As such comonomers, for example, the following may be named: dibasic acid component selected from aliphatic dicarboxylic acids such as oxalic, adipic, azelaic, and sebacic acids and derivatives thereof; aromatic dicarboxylic acids such as phthalic, isophthalic, 2,6-naphthalenedicarboxylic, and diphenic acids and derivatives thereof; alicyclic dicarboxylic acids such as cyclobutane-1,2-dicarboxylic, and hexahydroterephthalic acids; dicarboxylic acids containing elements other than carbon, hydrogen and oxygen, such as 5-sodiumsulfoisophthalic, 5-methylsulfoisophthalic acids and the compounds of the formulae:

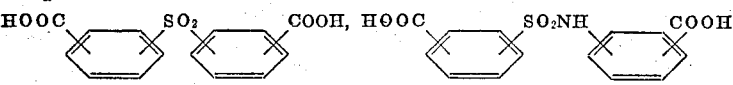

polybasic acid component such as trimellitic and pyromellitic acid: diol component such as diethylene glycol, propylene glycol, neopentyl glycol, polyethylene glycol, butanediol, p-xylylene glycol, cyclohexane-1,4-dimethanol, bisphenol A, 2,2-bis(4-hydroxyphenyl)propane, and 2,2-bis(p-hydroxyethoxyphenyl)propane: polyol component such as glycerine, pentaerythritol, etc., and hydroxycarboxylic acid component such as p-($\beta$-hydroxyethoxy)benzoic, vanilic, and glycolic acids. At least one of these components are used. Of course the copolycondensable component is not limited to the foregoing. Also, besides those copolycondensing components, monofunctional components such as benzoic acid, toluic acid, methoxypolyethylene glycol, etc., may be added in the purpose of, for example, adjustment of molecular weight.

Among the above-named esterification or ester-interchange catalysts, alkali metals and alkali metal compounds also possess the function of polycondensation catalyst in the preparation of polyester from bis($\beta$-hydroxyethyl)terephthalate. In the conventional industrial methods, there are the cases in which those compounds are used as the polycondensation catalyst. However in the process of the subject invention, the acceleration effect of the polycondensation reaction achieved by the addition of the alkaline substance in combination with the germanium compound is remarkable, which is by no means due to the simple addition catalytic effect of the alkaline substance. This is proven also by the fact which is later described in detail. That is, a phosphorus-containing compound may be added to the polycondensation system in order to inhibit objectionable side reaction. In that case, the alkaline substance would react with the phosphorus compound and lose its polycondensation catalytic activity almost completely (cf. Example 13). Whereas, in the presence of a phosphorus compound of the quantity sufficient to lose the alkaline substance its polycondensation catalytic activity, still the polycondensation efficiency higher than that achievable with the use of a germanium compound alone can be obtained.

During the research for satisfactory polycondensation catalyst, we first discovered that while crystalline germanium dioxide is hardly soluble in glycol-type organic solvents, it becomes easily soluble if an alkaline substance selected from alkali metals and hydrides, hydroxides, oxides, alcoholates and inorganic and organic acid salts of alkali metals, is present in the glycol-type solvents, and that the resultant solutions are very effective as the polycondensation catalyst in the preparation of polyester; and also that the separate addition of crystalline germanium dioxide and the alkaline substance to the reaction mixture for the polyester preparation still gives higher catalytic activity than that of the germanium dioxide alone, since the germanium dioxide and alkaline substance act on each other in the reaction system. Thus, in accordance with the subject invention, first the drawback in the use of cheap crystalline germanium compounds, such as germanium dioxide, as the polycondensation catalyst, i.e., the reduction in the rate of polycondensation due to the difficulty in uniformly dissolving the catalyst in the reaction mixture, is quickly solved. The complete dissolution of the catalyst in the reaction mixture also contributes to the preparation of polyesters of high degrees of polymerization which are useful as the materials of coloration- and turbidity-free, transparent fibers, film, and other shaped products. Furthermore, deposition of insoluble catalyst on the concerned parts in the reaction vessel, particularly on the feed pipe of the catalyst, can be effectively prevented. Thus the complete dissolution is also advantageous in that it contributes to stable operation of the reaction vessel over prolonged periods.

In accordance with the present invention the germanium compound is considered sufficiently dissolved when, by addition of 10 g. of a germanium compound sample to 1,000 g., of a solvent and subsequent 3 hours heating at 150° C. under agitation at atmospheric pressure at least 90% of the sample is dissolved, or reacted with the solvent and homogenized.

Before arriving at the process of this invention, we had long engaged in the basic studied on the catalytic activity of germanium compounds in polycondensation system, and investigated on the cause of their low catalytic activity in practice, against the expectation. In the course of the studies we determined the supply quantity of the germanium compound catalyst and the germanium content of the synthesized polyester, to discover that the germanium content of the polyester is markedly reduced from the initial supply. For example, when germanium tetraethoxide of the quantity corresponding to 100 p.p.m. of germanium to the starting dimethyl terephthalate was used in a conventional manner of ester-interchange reaction for 2 hrs., and the polycondensation reaction of 1.5 hours at a reduced pressure of no higher than 1 mm. Hg and at 275° C., the germanium content of the resultant polyester is 32 p.p.m., which was approximately only 30% of the initial supply. We also discovered that the longer the polycondensation time, the less becomes the germanium content remaining in the polymer. Based on the foregoing facts, we examined the balance of germanium, and detected a large quantity of germanium in the distilled ethylene glycol and the deposit on the upper walls of the polycondensation apparatus. In the subsequent studies, we discovered that the germanium compound used as the polycondensation catalyst reacts with ethylene glycol in the reaction mixture, to form germanium ethyleneglycoxide which sublimates under the polycondensation reaction conditions, i.e., elevated temperature and reduced pressure. Thus the greater part of the germanium compound escapes out of the reaction system by the sublimation, and consequently the germanium content of the polyester is markedly reduced from the initial supply of the germanium compound catalyst, achieving only unsatisfactory polycondensation efficiency. Whereas, we discovered that such loss of germanium compound from the reaction system due to sublimation can also be considerably prevented by the concurrent presence of an alkaline substance selected from alkali metals and hydrides, hydroxides, oxides, alcoholates and inorganic and organic acid salts of alkali metals, in the reaction mixture as proposed by the subject process. Thus, in accordance with the subject process, it is possible to accelerate the reaction rate of the polycondensation under the catalytic activity of a germanium compound and produce polyesters of high degrees of polymerization within short period. Also the damages caused by the deposition of sublimated germanium compound on the walls or exhaust pipe of the reaction vessel can be prevented. The presence of the alkaline substance is also found to contribute to the inhibition of diethylene glycol unit formation due to thermal decomposition of main chains, dehydration condensation of hydroxyethyl terminals, etc., and consequently to the prevention of lowering in the softening point of polyester.

The germanium compounds useful for the subject process are the tetravalent germanium compounds which are soluble in the reaction mixture, or soluble in the presence of the above-defined alkaline substance. As more specific examples, germanium hydride, halides or hydrohalides represented by a formula $GeX_4$ (in which X stands for H, F, Cl, Br or I, and the four X's may be different), or complex compounds of the foregoing with ammonia, e.g., $GeCl_4 \cdot 6NH_3$; germanium oxide, hydroxide or sulfide; germanic acid or germanate represented by the formulae such as $M_2GeO_3$, $M_4GeO_4$, $M_2Ge_2O_5$, $M_2Ge_5O_{11}$, etc. (in which M stands for H or a monovalent metal, in the case of $M_2GeO_3$ and $M_4GeO_4$, two M's may be a divalent metal; oxygen- and phosphorus-containing compounds of germanium such as $Ge(HPO_4)_2$, etc.; nitrogen-containing compounds of germanium, such as $Ge(NH_2)_4$, $Ge(NCO)_4$, $GeCl_3NCO$; and organo-germanium compounds of the formulae $R_nGeY_{4-n}$,

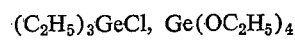

or $(R_3Ge)_2Z$ (in which R stands for optionally substituted alkyl, aryl, aralkyl, alkoxy, aryloxy, aralkyloxy, alkylthio, arylthio, aralkylthio, alkylamino or arylamino groups of 1–10 carbons, it being permissible that two R's from alkylenedioxy, alkylimino or arylimino groups; Y stands for H, Cl, Br, I, M, OM, NCO, $OCOCH_3$ or $NH_2$, M having the same signification defined in the foregoing and it being permissible that two Y's form NH;; Z stands for O or S; and $n$ is an integer of 1–4) may be named, and at least one of such germanium compounds can be used. Among the above examples, for instance the following compounds are themselves soluble in the reaction mixture: amorphous $GeO_2$, $GeCl_4$, $Ge(C_2HH_5)_4$,

$Ge(SC_2H_5)_4$, $[(C_2H_5)_3Ge]_2O$, $(C_2H_5)_3GeOCOCH_3$,

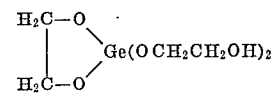

$Ge(HPO_4)_2$, and $K_2Ge_5O_{11}$. However, crystalline germanium dioxide is the least expensive, economically preferred germanium compound.

These germanium compounds are used in the quantities of, as converted to metal germanium 0.003–1 wt. percent, preferably 0.005–0.5 wt. percent, to the terephthalic acid component forming the staring bis(β-hydroxyethyl) terephthalate. Sufficient catalytic activity cannot be expected with the quantity less than 0.003 wt. percent.

The alkaline substances useful for the subject process include: alkali metals such as lithium, sodium, potassium, rubidium, and cesium; alkali metal hydrides such as lithium, sodium, potassium, rubidium and cesium hydrides; alkali metal hydroxides, oxides or alcoholates of a general formula M'OR' (in which M' is selected from lithium, sodium, potassium, rubidium and cesium, and R' is selected from H, M', optionally substituted alkyl, aryl and aralkyl groups of 1–10 carbons, preferably 1–7 carbons); for example, alcoholates of methanol, ethanol, propanol, isopropanol, butanol, n-hexanol, cyclohexanol, ethylene glycol, propylene glycol, diethylene glycol, and benzyl alcohol and phenolates of phenol and cresol; halides of lithium, sodium, potassium, rubidium and cesium; and inorganic and organic acid salts of such alkali metals, e.g., carbonates, bi-carbonates, nitrates, sulfates, sulfides, formates, acetates, propionates, n-butyrates, iso-butyrates, caproates, acrylates, chloroacetates, oxalates, succinates, benzoates, o-toluylates, p-toluylates, o-ethyl-benzoates, phthalates, 4-(β-hydroxyethoxy)benzoates, of the alkali metals. One or more of those alkaline substances can be concurrently used.

The appropriate quantities of those alkaline substances range, as converted to the alkali metal, 0.5–5.0 molar times, preferably 0.8–2.2 molar times, of the mol number of the germanium contained in the germanium compound used. When the quantity of the alkali metal in the alkaline substance is less than 0.5 molar time of the germanium in the germanium compound, solubility of the hard-soluble germanium compounds, such as germanium dioxide, in the reaction mixture is too low to obtain satisfactory polycondensation efficiency. With the use of approximately equimolar quantity or more of the alkaline substance, even germanium dioxide is uniformly dissolved and mixed in the reaction system to achieve high polycondensation efficiency. Whereas, when the quantity of alkaline substance exceeds 0.2 wt. percent to the terephthalic acid component, the product polymers are colored yellow or light yellow. This greatly reduces the commercial value of the product and should be avoided.

In accordance with the invention, the germanium compound and alkaline substance may be added to the reaction system either simultaneously or separately. Also the order of addition is not critical. They may be added as they are, or optionally as dissolved or suspended, together or separately, in a solvent which is harmless to the estersynthesizing and polycondensation reactions. The most effective means is to add both of them in the form of solution. As the solvent, glycols such as ethylene glycol, diethylene glycol, propylene glycol, etc. can be used, the most preferred being ethylene glycol.

Dissolution of germanium dioxide in glycols such as ethylene glycol on an industrial scale encounters various practical difficulties, since the operation requires long heating under reflux, dissolving under high temperature and pressure conditions, etc. Not only that, the operation is subject to such a drawback that undesirable side reactions of ethylene glycol, etc. tend to take place during the dissolving procedure. Germanium dioxide is normally crystalline, except the amorphous product prepared by special means, but its crystallinity is of various degrees, and its solubility in glycols also considerably differs accordingly. For example, a commercial germanium dioxide of 98% purity was added to ethylene glycol at the ratio of 33 g./l., heated at various temperatures for 30 hours under stirring, and thereafter measured of its solubility in ethylene glycol with the following results.

TABLE 1

| Temperature (° C.): | Solubility (g./l.) |
|---|---|
| 100 | 2 |
| 150 | 8 |
| 170 | 14 |
| 180 | 22 |
| 197 | 24 |

As demonstrated, the solubility improves with the temperature rise, but complete dissolution cannot be achieved. Furthermore, at higher temperatures the tendency of coloration of the solution becomes more conspicuous, which of course is objectionable.

Whereas, we discovered that when germanium dioxide is dissolved in glycols in the presence of the afore-specified alkaline substance, i.e., at least one of the alkaline substances selected from alkali metals, and hydrides, hydroxides, oxides, alcoholates, and inorganic and organic acid salts of alkali metals, the dissolving effect is quite satisfactory.

The remarkable increase in the saturation solubility of germanium dioxide in glycols under the concurrent presence of the alkaline substance is clearly demonstrated upon comparing the saturation solubility of germanium dioxide in ethylene glycol alone, with that in ethylene glycol containing equivalent of potassium hydroxide to the germanium. The saturation solubilities at 30° C. are as follows:

TABLE 2

| Type of solvent: | Saturation solubility (g./l.) |
|---|---|
| Ethylene glycol | 6.4 |
| Ethylene glycol+potassium hydroxide | 204.0 |

Thus is is clear that the concurrent presence of the alkali metal hydroxide markedly increases the solubility of germanium dioxide.

The dissolving of germanium dioxide in a glycol in the concurrent presence of the alkaline substance, however, is occasionally accompanied with heavy coloration, depending on the dissolving conditions and method. We performed extensive researches on quick preparation of colorless glycol solutions of germanium dioxide, and as the result discovered that if powdery germanium dioxide is added to a glycol in which the alkaline substance has been dissolved or added in advance, and the temperature of the system is gradually elevated from the initial point of below 100° C., the germanium dioxide can be quickly dissolved. Furthermore the solution is substantially coloration-free even at high temperatures, and has a high germanium concentration.

The advance dissolving of the alkaline substances in glycols is preferably performed at low temperatures. When germanium dioxide powder is added to the resultant solutions at temperatures below 100° C., the greater part of the powder dissolves within relatively short time. However, complete dissolution requires considerably longer time. For example, in ethylene glycol solvent, 5–6 hours are required at 100° C., and at 50° C., partially insoluble solid still remains even after 10 hours. Whereas, if the system is heated after the addition of germanium dioxide at below 100° C., to above 100° C., complete dissolution is achieved within several to several tens minutes, depending on the rate of temperature elevation. Similar phenomenon is observed when solid alkaline substance and germanium dioxide power are simultaneously added to ethylene glycol. Upon raising the temperature of the system from below 100° C., simultaneously with the dissolving of solid alkaline substance, the germanium dioxide also is quickly dissolved. However, according to the subject process, addition of germanium dioxide to high temperature glycols, i.e. above 100° C., should be avoided, since the risk of coloring the solution is great in such an operation. When ethylene glycol is used as the solvent, the operation is preferably performed entirely in an inert gaseous atmosphere, since ethylene glycol is easily affected by oxygen at high temperatures. In a preferred embodiment, at least 50% of the germanium dioxide is dissolved in a glycol at below 100° C., in the concurrent presence of a predetermined quantity of the alkaline substance, and the remaining undissolved portion is dissolved at 100–150° C. Thus high concentration glycol solutions of germanium dioxide can be prepared within a short time, without objectionable side reactions such as coloration.

The appropriate quantity of the alkaline substance used in the operation is 0.5–5.0 molar times the germanium dioxide as converted to the alkali metal, inter alia, equivalent. If it is less than 0.5 molar time the germanium dioxide, the solubility of the latter is markedly impaired and the expected result cannot be achieved. Again, when the germanium dioxide solution is used as the polycondensation catalyst in the synthesis of polyester, presence of the alkaline substance in the quantity of more than 5.0 molar times the germanium dioxide is objectionable, since such apts to cause coloration of the polyester. Whereas, of course germanium dioxide is easily soluble in glycols in the presence of greater quantity of the alkaline substance.

We furthermore discovered that the glycol solutions of germanium dioxide can be advantageously prepared by first forming the reaction product of germanium dioxide with a glycol, and adding the resultant compound to glycols in which at least one alkaline substance is concurrently present. The appropriate quantity of the alkaline substance in this case is 0.5–8.0 molar times the germanium content of the reaction product as converted to the alkali metal, inter alia, approximately equivalent. If it is less than 0.5 molar time, the solubility of the reaction product in glycols is markedly impaired. The order of adding the reaction product of germanium dioxide with a glycol and the alkaline substance to glycols is not critical. The two may also be added simultaneously. In order to demonstrate the effect of this method, the saturation solubility of the reaction product of germanium dioxide with ethylene glycol, in ethylene glycol and that in ethylene glycol which contains equimolar quantity of potassium hydroxide to the germanium in the compound, were compared at 3° C., 30° C., 65° C., and 100° C. The results are given in Table 3 below.

TABLE 3

| Type of solvent | Saturation solubility (g./l.)* | | | |
|---|---|---|---|---|
| | 3° C. | 30° C. | 65° C. | 100° C. |
| Ethylene glycol plus potassium hydroxide | 200 | 210 | 250 | >300 |
| Ethylene glycol | 2 | 5 | 20 | 45 |

*The concentration of the germanium compound in the solution was expressed as that of germanium dioxide.

The above results clearly indicate that the presence of the alkaline substance greatly improves the solubility of the reaction product in glycols. Thus when the reaction product of germanium dioxide with ethylene glycol is added to a glycol in which one or more of the specified alkaline substances are concurrently present, a homogeneous and thick glycol solution of germanium compound can be prepared within a short time, without the heating and stirring over a prolonged period. Furthermore, because the solubility of the reaction compound is substantially increased, the germanium compound does not precipitate at temperatures around temperature, but the form of the homogeneous solution is retained.

According to the present invention, the germanium compound and alkaline substance can be added to the reaction system at the optional stage prior to the termination of polycondensation reaction. For example, in case of synthesizing polyester from dimethyl terephthalate and ethylene glycol, they may be added to the reaction mixture before the ester-interchange reaction for making the starting bis($\beta$-hydroxyethyl)terephthalate, or, to the system after the ester-interchange reaction but before the removal of excessive ethylene glycol from the system at atmospheric or reduced pressures. Whereby the starting bis($\beta$-hydroxyethyl)terephthalate can contain both or either one of the germanium compound and alkaline substance. The addition may also be effected during the polycondensation reaction. It is discovered that if at this stage the germanium compound is added to the reaction system before completion of the polycondensation reaction, in no less than two divided portions, polyester of high degree of polymerization and minimum diethylene glycol unit content can be obtained within a shorter time and with better economical advantage compared with the case of adding the total quantity of the catalyst by single operation.

According to our studies, at the initial stage of polycondensation, the polycondensation rate is little affected by the quantity of catalyst, so far as at least 0.002 wt. percent of the germanium compound, as converted to its germanium content, to the terephthalic acid component is present in the system. In this point the initial stage is markedly different from the later stage of polycondensation. Accordingly, the escape of catalyst to outside the reaction system can be reduced to the minimum, by performing the initial period of polycondensation reaction at a low catalyst concentration, and later adding the germanium-containing catalyst before completion of the polycondensation. Also whereby the quick and economical synthesis of polyester of high degree of polymerization is achieved, which is not achievable with the single addition of total quantity of the catalyst.

We furthermore discovered that, when germanium compounds are used as the polycondensation catalyst, the diethylene glycol units which enter into the main chains of polyesters are formed mainly at the initial stage of polycondensation, and scarcely formed during the later stage; and also that the more the catalyst, the more the formation of diethylene glycol units. Therefore, when above-described divided addition of the catalyst is practiced, the diethylene glycol unit formation in the main chains is much less, because of the reduced germanium compound content of the system at the initial stage of the reaction. Thus high quality polyester can be obtained.

In such an addition method, the first addition may be performed at an optional stage before initiation of the polycondensation reaction. In case of synthesizing the polyester from dimethyl terephthalate and ethylene glycol, however, it is desirable to add the first fraction before the ester-interchange reaction, or after the ester-interchange reaction but before the elimination of excessive ethylene glycol from the system at atmospheric or reduced pressure, so that the starting bis($\beta$-hydroxyethyl)terephthalate should contain the germanium compound in advance. Also the quantity of the first fraction should be at least 0.002 wt. percent, as converted to the germanium content therein, to the terephthalic acid component which constitutes the bis($\beta$-hydroxyethyl)terephthalate. The addition of second and subsequent fractions of the polycondensation catalyst is performed when the average degree of polymerization of the polymer reached 15–80% of ultimately desired average polymerization degree of the polyester. The quantity of each fraction is no less than 0.002 wt. percent, as converted to the germanium content, to the therephthalic acid component constituting bis($\beta$-hydroxyethyl)terephthalate. In total, the germanium compound as converted to its germanium content should not exceed 1 wt. percent. If the addition of second and subsequent fractions of the catalyst is effected before the average degree of polymerization of the product reaches 15% of the ultimately desired degree of polymerization, the result is little different from the case of adding the total catalyst at one time. Again addition of the second and subsequent catalyst fractions to the system after the polymerization degree of the product exceeds 80% of the ultimately desired value is disadvantageous, since the polycondensation will terminate before the catalytic activity of the second and subsequent fractions is fully exhibited. The germanium compound used as the second and subsequent catalyst fractions is not necessarily identical with that which is used as the first fraction.

In the subject process, other catalysts and additives may be concurrently present in the polycondensation reaction system. Particularly the addition of any one or more of the following compounds is effective for preventing objectionable side reactions such as decomposition during the synthesis of polyester: wide varieties of organic and inorganic phosphorus compounds, e.g., oxy acids of phosphorus such as phosphoric, phosphorous, hypophosphorous, metaphosphoric, and pyrophosphoric acids; oxy acid salts of phosphorus such as alkali metal salts, alkaline earth metal salts, and ammonium salts of the foregoing oxy acids of phosphorus; phosphorus halides such as phosphorus trichloride and pentachloride; oxyhalides of phosphorus such as phosphorus oxychloride; esters of oxy acids of phosphorus represented by the formulae

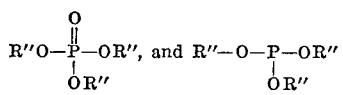

(in which R'' is selected from hydrogen and optionally substituted alkyl, aryl, and aralkyl groups of 1–18 carbons, at least one of the R'''s is a group other than hydrogen, and the three R'''s may be same or different); phosphonic acid, phosphinic acid and their derivatives represented by the formulae

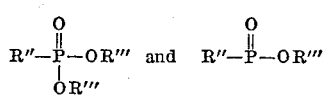

(in which R'' has the same signification as defined in the above, are R''' is selected from hydrogen, alkali metals, and alkyl, aryl, and aralkyl groups of 1–10 carbons); phosphines and phosphine oxides represented by the formulae

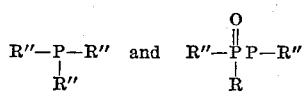

(in which R'' has the same signification as defined in the above); and phosphoryl amides represented by the formula

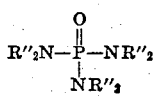

(in which R" has the same signification as defined in the above). Those phosphorus compounds can be added to the reaction system at the optional stage after the esterification or ester-interchange reaction and before or after the initiation of polycondensation reaction. If the germanium compound is added in more than one divided portions as described in the foregoing, those phosphorus compounds are added with the second catalyst fraction to produce polyester of high degree of polymerization. The phosphorus compounds can be used as they are, or as dissolved or suspended in solvents which are not detrimental to the polycondensation reaction, such as glycols. The appropriate quantity of the phosphorus compound somewhat differs depending on the quantities of the esterification or ester-interchange catalyst and polycondensation catalyst employed, but normally ranges, as converted to phosphorus atom, 0.001–1 wt. percent, preferably 0.001–0.3 wt. percent to the terephthalic acid component constituting bis($\beta$-hydroxyethyl)terephthalate.

Hereinafter the invention will be explained with reference to working examples, in which parts are by weight. The viscosity ($\eta$) is the intrinsic viscosity measured in a mixed solvent consisting of 50 parts of phenol and 50 parts of tetrachloroethane, at 30° C. The degree of whiteness is calculated from the formula below, using the reflectivity of spun and undrawn fiber of 1.8 deniers as packed in a glass cell, measured with a spectrophotometer, unless otherwise specified.

Whiteness (percent) = 4×(reflectivity at 450 m$\mu$)
  −3×(reflectivity at 550 m$\mu$)

When the above value is 75% or above, the polyester can be regarded substantially colorless.

The diethylene glycol unit content of polymer is determined by analyzing the solution obtained by decomposing the polymer with hydrazine, by means of gas chromatograph, and expressed by the mol percent of diethylene glycol to ethylene glycol.

EXAMPLE 1

A system consisting of 100 parts of dimethyl terephthlate, 100 parts of ethylene glycol, and 0.05 part of zinc acetate as the ester-interchange catalyst was heated at 185° C. for 2 hours, and the methanol formed was distilled off the system. Then 0.03 part of germanium dioxide and 0.016 part of potassium hydroxide as dissolved in 10 parts of ethylene glycol and 0.03 part of trimethyl phosphate as dissolved in 10 parts of ethylene glycol were added to the system. Thereafter the temperature of the system was raised to 275° C. by 30 minutes heating, while the ethylene glycol was distilled off. Subsequently the polycondensation was performed for 15 minutes at 20–30 mm. Hg, and for further 1.5 hours at a reduced pressure not higher than 1 mm. Hg, at 275° C. Thus a polyester showing an ($\eta$) of 0.71, whiteness of 78%, and containing 1.8 mol percent of diethylene glycol was obtained.

EXAMPLE 2

This example illustrates the omission of the alkaline substance to be concurrently used with the germanium compound in accordance with the present invention.

The ester-interchange reaction was performed in the manner similar to Example 1. To the system then 0.03 part of germanium dioxide as suspended in 10 parts of ethylene glycol was added as the polycondensation catalyst, and 0.03 part of trimethyl phosphate as dissolved in 10 parts of ethylene glycol, as an additive. The subsequent operations were performed similarly to Example 1. The product polyester had an ($\eta$) of 0.43, whiteness of 86%, and diethylene glycol content of 2.3 mol percent. Thus the degree of polymerization was less than that of the product of Example 1, while the diethylene glycol content was greater. This is presumably caused by the poor solubility of germainum dioxide.

EXAMPLE 3

To the reaction mixture resultant from the ester-interchange reaction performed similarly to that of Example 1, 0.01 part of germanium dioxide and 0.005 part of sodium hydroxide as dissolved in 10 parts of ethylene glycol, and 0.03 part of phosphorus acid as dissolved in 5 parts of ethylene glycol was added. The polycondensation similarly to Example 1 is performed.

The ($\eta$), whiteness and diethylene glycol contents of the product polyesters obtained in the Examples 3–31 and Controls are shown in Table 4.

EXAMPLE 4

To the reaction mixture completed of the ester-interchange reaction similarly to Example 1, 0.01 part of germanium dioxide as suspended in 5 parts of ethylene glycol, 0.01 part of potassium hydroxide as dissolved in 5 parts of ethylene glycol, and 0.03 part of triphenyl phosphate as dissolved in 5 parts of ethylene glycol were added separately. Performing the polycondensation similarly to Example 1, a high quality polyester was obtained.

EXAMPLE 5

To the reaction mixture before the initiation of ester-interchange reaction, 0.02 part of germanium dioxide was added, and then the ester-interchange was performed similarly to Example 1. Thereafter 0.01 part of potassium hydroxide and 0.03 part of trimethyl phosphite as dissolved in 10 parts of ethylene glycol was added to the system, followed by polycondensation.

EXAMPLE 6

To 500 parts of ethylene glycol, first 5 parts of metal sodium was added and dissolved. Then 22.7 parts of germanium dioxide (equimolar to the metal sodium) was added to above solution, and stirred for 15 minutes at 100° C., it was completely dissolved. (Also for comparison, 22.7 parts of germanium dioxide alone was added to 500 parts of ethylene glycol and stirred for 30 hours at 100° C. Dissolution of the germanium dioxide in ethylene glycol however was still incomplete.)

An ester-interchange reaction was performed similarly to Example 1, and to the reaction mixture 0.7 part of the catalyst solution synthesized as in the above (0.03 part as converted to germanium dioxide) was added as the polycondensation catalyst. Also 0.03 part of trimethyl phosphate as dissolved in 5 parts of ethylene glycol was added as an additive. Subsequently the temperature of the system was raised to 275° C. by 30 minute heating, and ethylene glycol was distilled off. The polycondensation was performed for 15 minutes at 20–30 mm. Hg, and for further 1.5 hours at a reduced pressure not higher than 1 mm. Hg, at 275° C.

EXAMPLE 7

This example illustrates the case of omitting the concurrent use of the alkaline substance in the polycondensation catalyst system.

After performing an ester-interchange reaction similarly to Example 1, 0.03 part of germanium dioxide as dissolved in 1 part of ethylene glycol was added to the reaction mixture as the polycondensation catalyst, together with 0.03 part of trimethyl phosphate as dissolved in 5 parts of ethylene glycol. The subsequent operations were performed similarly to Example 6.

EXAMPLE 8

A sodium ethylate solution was prepared by dissolving 10 parts of metal sodium in 100 parts of ethanol, and to which 22.7 parts (0.5 molar time of the metal sodium) of germanium dioxide and 50 parts of ethylene glycol were added. Upon subsequent 15 minutes' heating under agitation with reflux, a uniform solution was obtained.

An ester-interchange reaction was performed similarly to Example 1, and to that system 0.08 part of the catalyst solution as prepared in the above was added as the polycondensation catalyst (0.01 part as converted to germanium dioxide). Also 0.03 part of phosphorous acid as dissolved in 5 parts of ethylene glycol was added to the system, followed by polycondensation similar to that in Example 1.

EXAMPLE 9

Five (5) parts of metal potassium was added to 100 parts of n-butanol, and upon dissolving of the metal potassium, excessive n-butanol was distilled off in nitrogen current. To thus obtained potassium butylate, 50 parts of ethylene glycol and 13.4 parts of germanium dioxide (equimolar to the metal potassium) were added, followed by 20 minutes' stirring at 100° C. Thus a homogeneous solution was obtained.

To the same starting materials for ester synthesis as employed in Example 1, 0.116 part of the catalyst solution as prepared in the above (0.02 part as converted to germanium dioxide) was added before the initiation of ester-interchange reaction, and the ester-interchange reaction was performed similarly to Example 1. Thereafter 0.03 part of triphenyl phosphite as dissolved in 5 parts of ethylene glycol was added to the system, followed by the polycondensation reaction similar to that in Example 1.

EXAMPLE 10

After performing an ester-interchange reaction similarly to Example 1, each 0.01 part of solid sodium ethylate and germanium dioxide were added to the system, followed by an addition of 0.03 part of trimethyl phosphate as dissolved in 5 parts of ethylene glycol. The subsequent operations were performed similarly to Example 1. The polyester resulted from the polycondensation had a high quality shown in Table 4.

EXAMPLE 11

To the same polyester-forming materials as employed in Example 1, 0.02 part of germanium dioxide and 0.005 part of metal sodium were added before initiation of the ester-interchange reaction. After performing the ester-interchange reaction similarly to Example 1, 0.03 part of phosphorous acid was added to the system, followed by the polycondensation performed similarly to Example 1.

EXAMPLE 12

To the same polyester-forming materials as employed in Example 1, 0.02 part of germanium dioxide was added prior to the ester-interchange reaction which was subsequently performed similarly to Example 1. Then 0.04 part of sodium benzylate and 0.03 part of triphenyl phosphite were added to the reaction system together with 10 parts of ethylene glycol. Performing the polycondensation similarly to Example 1, a good quality polyester was obtained.

EXAMPLE 13

0.05 part of germanium tetraethoxide was added to the same polyester-forming materials as employed in Example 1, and an ester-interchange reaction was performed similarly to Example 1. Then 0.02 part of sodium hydroxide and 0.04 part of trimethyl phosphate were added to the system, followed by the polycondensation performed similarly to Example 1. The product polyester had an [$\eta$] of 0.81, whiteness of 73% and diethylene glycol content of 1.8 mol percent.

When the addition of sodium hydroxide was omitted in the above procedures, the product polyester had an [$\eta$] of 0.68, whiteness of 81%, and diethylene glycol content of 2.4 mol percent. Thus in the Control the degree of polymerization was low and diethylene glycol content was high, probably because the Ge(OC$_2$H$_5$)$_4$ was lost by sublimation. Also when 0.05 part of zinc acetate was used as the ester-interchange catalyst and the subsequent polycondensation was performed in the presence of 0.02 part of sodium hydroxide and 0.04 part of trimethyl phosphate, scarcely any polycondensation took place. This is probably because the polycondensation catalytic activity of sodium hydroxide was suppressed by the phosphorus compound.

EXAMPLE 14

An ester-interchange reaction identical with that in Example 1 was performed, except that 0.03 part of tetraethylgermane was added as the polycondensation catalyst. Then 0.02 part of potassium hydroxide and 0.03 part of phosphoric acid were added to the system, followed by the polycondensation performed similarly to Example 1.

EXAMPLE 15

To the same polyester-forming materials as employed in Example 1, 0.07 part of manganese acetate as the ester-interchange reaction, 0.04 part of potassium ethylate, and 0.05 part of germanium ethylene glycoxide, obtained from germanium tetraethoxide and ethylene glycol, were added, and the ester-interchange reaction was performed similarly to Example 1. Then 0.05 part of phosphorous acid was added, followed by the polycondensation performed similarly to Example 1.

EXAMPLE 16

To the reaction mixture completed of the ester-interchange reaction similarly to Example 1, a solution consisting of one part of ethylene glycol and 0.01 part of sodium, 0.02 part of amorphous germanium dioxide, and 0.03 part of triphenyl phosphite were added, followed by the polycondensation in the manner similar to Example 1.

EXAMPLE 17

Example 16 was repeated except that the addition of triphenyl phosphite was omitted. The product polyester had an [$\eta$] of 0.89, whiteness of 53%, and diethylene glycol content of 3.6 mol percent. In the absence of the phosphorus compound, [$\eta$] was higher, but the product was inferior in whiteness, and its diethylene glycol content increased.

EXAMPLE 18

After performing the ester-interchange reaction similarly to Example 1, 0.03 part of sodium ethoxide, 0.05 part of germanium phosphate, and 0.01 part of trimethyl phosphate were added to the system, followed by the polycondensation performed similarly to Example 1.

EXAMPLE 19

A system consisting of 100 parts of dimethyl terephthalate, 72 parts of ethylene glycol, and 0.03 part of zinc acetate as the ester-interchange catalyst, was heated at 160–200° C. for 2 hours, and the methanol formed was distilled off the reaction system. Then as the polycondensation catalyst, 0.03 part of germanium dioxide and 0.02 part of potassium carbonate as dissolved in 2 parts of ethylene glycol, and 0.05 part trimethyl phosphate as dissolved in 2 parts of ethylene glycol were added to the reaction mixture. The temperature of the system was elevated to 240° C. by 30 minutes' heating, while ethylene glycol was distilled off the system. The heating was continued until the temperature reached 270° C. In the meantime, polycondensation was performed at a reduced pressure of 20–30 mm. Hg for 30 minutes, and for further 1.5 hours at the same temperature and reduced pressure of not higher than 1 mm. Hg.

Note, however, that in Examples 19–27, the whiteness was determined as follows. The polymer was dissolved in o-chlorophenol, and its percent transmissions at 410 and 550 m$\mu$ were measured with a spectrophotometer.

Based on the measured results, the whiteness was calculated by the equation below:

Whiteness=4× (percent transmission at 410 mμ)
—3× (percent transmission at 550 mμ).

EXAMPLE 20

After an ester-interchange reaction similar to that in Example 19, a suspension formed of 0.03 part of germanium dioxide and 2 parts of ethylene glycol (containing no potassium carbonate) as the polycondensation catalyst, and a solution consisting of 0.05 part of trimethyl phosphate and 2 parts of ethylene glycol, were added to the reaction mixture, followed by the polycondensation performed similarly to Example 19. The product polymer had an [η] of 0.49, whiteness of 83%, and diethylene glycol content of 2.5 mol percent. The low [η] and high diethylene glycol content were probably caused by poor solubility of germanium dioxide.

EXAMPLE 21

Example 20 was repeated except that the polycondensation catalyst was replaced by a solution obtained by adding 0.03 part of germanium dioxide to 4 parts of ethylene glycol and heating the mixture at 170° C. for 30 hours (containing no potassium carbonate). The product polymer had an [η] of 0.67, whiteness of 67%, and diethylene glycol content of 3.5 mol percent. This result demonstrates that even when an ethylene glycol solution in which germanium dioxide is dissolved consuming a long period is used as the polycondensation catalyst, the [η] of the polymer is rather low in the absence of the alkaline substance. Also the whiteness and diethylene glycol content of the product are unsatisfactory.

EXAMPLE 22

To a reaction mixture completed of an ester-interchange reaction similarly to Example 19, 0.02 part of germanium dioxide and 0.01 part of sodium carbonate as dissolved in 2 parts of ethylene glycol, and 0.05 part of triphenyl phosphate as dissolved in 2 parts of ethylene glycol were added. Subsequently polycondensation of the mixture was performed in the manner similar to Example 19.

EXAMPLE 23

To a reaction mixture completed of the ester-interchange reaction similarly to Example 19, 0.02 part of germanium dioxide and 0.016 part of sodium hydrogencarbonate as dissolved in 2 parts of ethylene glycol, and 0.05 part of triphenyl phosphate as dissolved in 2 parts of ethylene glycol were added. The system was subsequently polycondensed similarly to Example 19.

EXAMPLE 24

To a reaction mixture completed of the ester-interchange reaction as in Example 19, 0.02 part of germanium dioxide and 0.019 part of potassium acetate as dissolved in 2 parts of ethylene glycol, and 0.05 part of trimethyl phosphate as dissolved in 2 parts of ethylene glycol, were added. The mixture was then polycondensed in the manner similar to Example 19.

EXAMPLE 25

To a reaction mixture completed of the ester-interchange reaction similarly to Example 19, 0.02 part of germanium dioxide and 0.014 part of lithium carbonate as dissolved in 2 parts of ethylene glycol, and 0.05 part of trimethyl phosphate as dissolved in 2 parts of ethylene glycol, were added, and the system was polycondensed.

EXAMPLE 26

An autoclave equipped with a distillation column was charged with 100 parts of terephthalic acid, 70 parts of ethylene glycol and 0.02 part of calcium acetate. The system in the autoclave was reacted at 240° C. and a pressure of 2.2 kg./cm.²g., while the formed gas was removed through the gas outlet. When distillation of water stopped, the pressure was reduced to 1.0 kg./cm.²g., and the reaction was continued for further 30 minutes. 0.02 part of germanium dioxide and 0.042 part of rubidium benzoate as dissolved in 2 parts of ethylene glycol and 0.03 part of triphenyl phosphite as dissolved in 2 parts of ethylene glycol were added to the reaction mixture, and the system was heated to 270° C. Then it was polycondensed under reduced pressure similarly to Example 19.

EXAMPLE 27

To a reaction mixture completed of the ester-interchange reaction similarly to Example 19, 0.02 part of germanium dioxide and 0.062 part of cesium carbonate as dissolved in 2 parts of ethylene glycol, and 0.05 part of trimethyl phosphate as dissolved in 2 parts of ethylene glycol were added, and the mixture was polycondensed similarly to Example 19.

EXAMPLE 28

To a reaction mixture completed of the ester-interchange reaction similarly to Example 1, 0.01 part of amorphous germanium dioxide, 0.01 part of sodium as dissolved in one part of ethylene glycol, and 0.03 part of triphenyl phosphite were added. The temperature of the system was raised to 275° C. by 30 minutes' heating, and the ethylene glycol was distilled off. Then the system was polycondensed for 15 minutes at a reduced pressure of 20–30 mm. Hg, and for further 30 minutes at a reduced pressure not higher than 1 mm. Hg, at 275° C. The product polymer had an [η] of 0.52. To the system then 0.01 part of amorphous germanium dioxide was added, and the polycondensation was continued for an additional hour at 275° C. The product polyester had an [η] of 0.86, whiteness of 81%, and diethylene glycol content of 1.0%.

Comparing this polyester with the product of Example 16 which was identical with this example except that the total quantity of amorphous germanium dioxide was added by once, the viscosity, i.e., degree of polymerization, was higher and diethylene glycol content was less.

EXAMPLE 29

After performing an ester-interchange reaction similarly to Example 1, 0.01 part of germanium tetraethoxide, 0.03 part of phosphorous acid and 0.02 part of potassium hydroxide were added to the system. Then the system was polycondensed for 30 minutes similarly to Example 1. Whereupon the product polymer had an [η] of 0.46. Then 0.02 part of germanium tetraethoxide as suspended in 0.1 part of ethylene glycol was added to the system, and the polycondensation was continued for an hour under the same conditions as employed in Example 1.

EXAMPLE 30

A system consisting of 100 parts of dimethyl terephthalate, 100 parts of ethylene glycol, 0.07 part of manganese acetate as an ester-interchange catalyst, and 0.01 part of tetraethylgermane as a polycondensation catalyst, was subjected to an ester-interchange reaction similarly to Example 1. Thereafter 0.01 part of lithium ethoxide was added to the system which was subsequently polycondensed for 30 minutes in conventional manner. The product polymer then had an [η] of 0.56. Further 0.02 part of bisethylenedioxygermanium

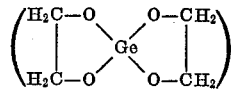

and 0.03 part of phosphoric acid were added to the system, and the polycondensation was continued for an hour at 275° C. and a reduced pressure of not higher than 1 mm. Hg. The product polyester had an [η] of 0.83, whiteness of 75%, and diethylene glycol content of 2.2 mol percent.

The above operations were repeated except that 0.01 part of tetraethylgermane was added before initiation of the ester-interchange reaction, and 0.01 part of lithium ethoxide, 0.02 part of bisethylenedioxygermanium, and 0.03 part of phosphoric acid were added after termination of the ester-interchange reaction. The polycondensation was performed for 1.5 hours. The product polyester had an [η] of 0.75, whiteness of 77%, and diethylene glycol content of 2.7 mol percent. Thus, unless the addition of second fraction of germanium compound is effected after the degree of polymerization of the product polymer reaches the appropriate value, the finally obtained polyester had a low degree of polymerization and high diethylene glycol content.

EXAMPLE 31

A system consisting of 100 parts of dimethyl terephthalate, 100 parts of ethylene glycol, 0.05 part of zinc acetate, and 0.01 part of germanium tetrachloride was subjected to an ester-interchange reaction. Then 0.01 part of germanium tetraethoxide, 0.01 part of sodium hydroxide, and 0.04 part of trimethyl phosphate were added to the reaction mixture. The system was subsequently polycondensed for 30 minutes in the conventional manner. The [η] of the product polymer was then 0.55. Further 0.01 part of germanium phosphate was added, followed by additional 30 minutes' polycondensation. Whereupon [η] of the polymer reached 0.79. Again 0.01 part of

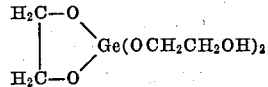

was added, followed by 30 minutes' polycondensation. The product polyester had an [η] of 0.96, whiteness of 76%, and diethylene glycol content of 2.0 mol percent.

Under the similar operations, the ester-interchange reaction was performed in the presence of 0.05 part of zinc acetate and 0.01 part of germanium tetrachloride. Then 0.01 part of germanium ethoxide, 0.01 part of germanium phosphate, 0.01 part of

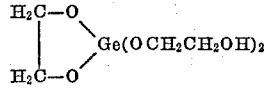

0.01 part of sodium hydroxide, and 0.04 part of trimethyl phosphate were simultaneously added to the system, followed by 1.5 hours' polycondensation in the conventional manner. The product polyester had an [η] of 0.84, whiteness of 74%, and diethylene glycol content of 2.6 mol percent. Thus, compared with the former product, the latter product's viscosity was low, and diethylene glycol content was high.

TABLE 4

|  | [η] | Whiteness (percent) | Diethylene glycol content (mol percent) |
| --- | --- | --- | --- |
| Example No. 3 | 0.67 | 84 | 1.4 |
| Example No. 4 | 0.69 | 80 | 1.4 |
| Example No. 5 | 0.71 | 76 | 1.6 |
| Example No. 6 | 0.73 | 79 | 1.3 |
| Example No. 7 (control) | 0.43 | 86 | 2.4 |
| Example No. 8 | 0.68 | 75 | 0.9 |
| Example No. 9 | 0.70 | 81 | 1.4 |
| Example No. 10 | 0.66 | 82 | 1.0 |
| Example No. 11 | 0.73 | 77 | 1.5 |
| Example No. 12 | 0.73 | 73 | 1.4 |
| Example No. 13 | 0.81 | 73 | 1.8 |
| Control | 0.68 | 81 | 2.4 |
| Example No. 14 | 0.85 | 70 | 1.6 |
| Example No. 15 | 0.82 | 75 | 1.8 |
| Example No. 16 | 0.82 | 78 | 1.5 |
| Example No. 17 | 0.89 | 53 | 3.6 |
| Example No. 18 | 0.76 | 81 | 0.8 |
| Example No. 19 | 0.73 | 74 | 2.3 |
| Example No. 20 (control) | 0.49 | 83 | 2.5 |
| Example No. 21 (control) | 0.67 | 68 | 3.5 |
| Example No. 22 | 0.67 | 79 | 2.0 |
| Example No. 23 | 0.68 | 78 | 2.1 |
| Example No. 24 | 0.66 | 79 | 2.1 |
| Example No. 25 | 0.67 | 78 | 2.0 |
| Example No. 26 | 0.66 | 76 | 2.2 |
| Example No. 27 | 0.68 | 76 | 2.1 |
| Example No. 28 | 0.86 | 81 | 1.0 |
| Example No. 29 | 0.80 | 82 | 0.8 |
| Example No. 30 | 0.83 | 75 | 2.2 |
| Control | 0.75 | 77 | 2.7 |
| Example No. 31 | 0.96 | 76 | 2.0 |
| Control | 0.84 | 74 | 2.6 |

EXAMPLE 32

Into a 400-ml. capacity, three neck distillation flask equipped with a stirrer (which will be referred to simply as the "flask" in the following Examples 33–51), 250 ml. of ethylene glycol, 2.6 g. of sodium carbonate and 5.1 g. of germanium dioxide were added, and the system was heated to 90° C. from room temperature, consuming 30 minutes, in nitrogen atmosphere with stirring. The stirring was continued for further 1.5 hours at 90° C. Whereupon the germanium dioxide was dissolved almost completely. The minor quantity of remaining solid germanium dioxide was dissolved completely when the temperature of the system was raised to 140° C. by an hour's heating. The solution was substantially free from coloration.

When 250 ml. of ethylene glycol and 2.6 g. of sodium carbonate were put in the same flask and heated to 170° C., and 5.1 g. of germanium dioxide was added thereto, coloring of the system was observed after 30 minutes' stirring in nitrogen atmosphere. After 2 hours' heating the germanium dioxide was completely dissolved, but the solution was heavily colored.

EXAMPLE 33

To 250 ml. of ethylene glycol in the flask, 1.2 g. of metal sodium was added and completely dissolved. Further 5.3 g. of germanium dioxide was added, and the temperature of the system was raised from room temperature to 80° C. by 30 minutes' heating in nitrogen atmosphere, with stirring. Whereupon the greatest part of the germanium dioxide was dissolved, and the remnant was completely dissolved when temperature was further raised to 130° C. by 30 minutes' heating. The solution was substantially free from coloration.

EXAMPLE 34

Two-hundred-and fifty (250) ml. of propylene glycol, 3.3 g. of potassium carbonate, and 5.1 g. of germanium dioxide were placed in the flask, and gradually heated from room temperature to 90° C. over a period of 30 minutes in nitrogen atmosphere, with stirring. The stirring was continued at 90° C. for 3 hours. Whereupon the greater part of the germanium dioxide was dissolved, and the rest was completely dissolved when the temperature was further raised to 135° C. by an hours' heating followed by an additional hours' stirring at 135° C. The solution was substantially free from coloration.

EXAMPLES 35–41

The flask was charged with 250 ml. of ethylene glycol, 5 g. of germanium dioxide and an alkaline substance of the type of quantity varied in each run as indicated in Table 5. The temperature of the system was raised from room temperature to 90° C. by 30 minutes' heating in nitrogen atmosphere with stirring. The stirring was continued at 90° C. for the period varied in each run (X hours). Whereupon in all cases the greatest part of the germanium dioxide was dissolved in ethylene glycol. The temperature was further raised to 140° C. by an hour's heating, and at 140° C. each system was stirred for the period indicated in Table 5 as Y hours. Whereupon in all cases the germanium dioxide was completely dissolved, and the solution was free from coloration.

TABLE 5

| Ex. No. | Alkali substance Type | Quantity (g.) | X (hrs.) | Y (hrs.) |
| --- | --- | --- | --- | --- |
| 35 | Potassium carbonate | 3.2 | 1 | 1.5 |
| 36 | Sodium hydrogencarbonate | 4.2 | 2.5 | 1 |
| 37 | Sodium acetate | 6.6 | 2 | 2 |
| 38 | Sodium methoxide | 2.5 | 2 | 3 |
| 39 | Lithium hydrogencarbonate | 3.3 | 1.5 | 2 |
| 40 | Cesium carbonate | 8.2 | 1.5 | 1 |
| 41 | Rubidium carbonate | 5.3 | 1.5 | 1 |

EXAMPLE 42

The flask was charged with 250 ml. of ethylene glycol and 3 g. (0.13 mol) of metal sodium, and heated to 100° C. Further 25 g. of a reaction product of germanium dioxide with ethylene glycol was added, and the system was stirred in nitrogen atmosphere for 12 minutes. The reaction product was completely dissolved and the solution was coloration-free. When the solution was cooled to 20° C. and let stand for 10 hours, no precipitation of crystals took place.

Whereas, when 250 ml. of ethylene glycol alone was put in the flask, heated to 100° C., and added with 25 g. of the same reaction product of germanium dioxide with ethylene glycol, followed by 10 hours' stirring in nitrogen atmosphere, a large quantity of undissolved crystals remained in the system.

EXAMPLES 43–49

The system consisting of 250 ml. of ethylene glycol and an alkali metal compound of the type and quantity varied for each run as indicated in Table 6, was heated to 100° C. in the flask. Further various quantities of the reaction product of germanium dioxide with ethylene glycol was added, and the system was stirred in nitrogen atmosphere. The reaction product was in all cases completely dissolved within 10–20 minutes' stirring, and the solutions were coloration-free. When the solutions were cooled to 20° C. and let stand for 6 hours, precipitation of crystals was not observed.

TABLE 6

| Ex. No. | Alkali metal compound Type | Quant'ty g. (mol) | Quantity of reaction product (g.) | Stirring time (min.) |
|---|---|---|---|---|
| 43 | Sodium hydroxide | 5 (0.125) | 25 | 10 |
| 44 | Potassium bicarbonate | 8 (0.08) | 15 | 15 |
| 45 | Lithium carbonate | 3 (0.0405) | 15 | 15 |
| 46 | Sodium acetate | 7 (0.0855) | 15 | 15 |
| 47 | Sodium methoxide | 7 (0.13) | 25 | 20 |
| 48 | Rubidium hydroxide | 8 (0.078) | 15 | 10 |
| 49 | Cesium carbonate | 13 (0.04) | 15 | 20 |

EXAMPLE 50

Two-hundred-and fifty (250) ml. of ethylene glycol containing 2.7 g. of sodium hydroxide was put in the flask, added with 7.4 g. of germanium dioxide of 98% purity at room temperature, and heated in nitrogen atmosphere with stirring. The temperature was raised to 150° C. by approximately an hour's heating. When the system was maintained at that temperature for an additional hour, the germanium dioxide was completely dissolved. The solution was substantially free from coloration.

EXAMPLE 51

To 250 ml. of ethylene glycol put in the flask, 6.92 g. of solid potassium hydroxide and 12.4 g. of powdery germanium dioxide of 98% purity were added simultaneously. The system was heated in nitrogen atmosphere with stirring. The temperature reached 100° C. after approximately an hour, and 130° C. after approximately further two hours. When the system was maintained at 130° C. for an additional hour, the germanium dioxide was completely dissolved, and the solution was free from coloration.

EXAMPLE 52

To 200 ml. of diethylene glycol put in a 300-ml. capacity, three neck distillation flask equipped with a stirrer, 2.43 g. of solid potassium hydroxide and 4.2 g. of powdery germanium dioxide of 98% purity were added simultaneously. The system was heated in nitrogen atmosphere with stirring. Its temperature reached 100° C. approximately after 2 hours, and 130° C. approximately after another hour. When the system was maintained at 130° C. for an additional hour, the germanium dioxide was completely dissolved, and the solution was free from coloration.

EXAMPLE 53

To 200 ml. of propylene glycol in a 300-ml. capacity, three neck distillation flask equipped with a stirrer, 1.68 g. of solid sodium hydroxide and 4.1 g. of high purity, powdery germanium dioxide were added simultaneously, and the system was heated in nitrogen atmosphere with stirring. The temperature reached 100° C. after approximately 1.5 hours, and 140° C. after approximately 2 additional hours. The germanium dioxide was completely dissolved, and the solution was free from coloration.

EXAMPLES 54–59

Ester-interchange and polycondensation reactions were performed in the manner similar to Example 1, except that the compounds identified in Table 7 below were added as the comonomers to each 100 parts of dimethyl terephthalate and 90 parts of ethylene glycol. The $[\eta]$, whiteness, and diethylene glycol content of each polyester produced are also given in the same table.

TABLE 7

| Ex. No. | Comonomer Type | Quantity (parts) | $[\eta]$ dl./g. | Whiteness percent | Diethylene glycol content (mol percent) |
|---|---|---|---|---|---|
| 54 | Dimethyl isophthalate | 10 | 0.70 | 79 | 2.0 |
| 55 | Dimethyl adipate | 10 | 0.68 | 75 | 1.8 |
| 56 | Cyclohexane-1,4-dimethanol | 10 | 0.71 | 76 | 1.7 |
| 57 | p-Xylylene glycol | 10 | 0.72 | 76 | 1.8 |
| 58 | Pentaerythritol | 5 | 0.76 | 72 | 2.1 |
| 59 | p-(β-Hydroxyethoxy) methyl benzoate | 10 | 0.67 | 80 | 1.6 |

What is claimed:

1. A process for the preparation of a film and fiber-forming polyester in which at least 80% of the recurring structural units are composed of ethylene terephthalate units, which comprises polycondensing bis(β-hydroxyethyl)terephthalate, or a mixture of bis(β-hydroxyethyl) terephthalate and at least one comonomer which is copolycondensable with said bis(β-hydroxyethyl)terephthalate, said bis(β-hydroxyethyl)terephthalate being present in said mixture in a quantity sufficient to yield at least 80% ethylene terephthalate units in said film-forming and fiber-forming polyester, in a reaction medium consisting essentially of an admixture of (A) 0.003 to 1% by weight of, calculated as germanium, based on the terephthalic acid component of said bis(β-hydroxyethyl)terephthalate, a tetravalent germanium compound selected from the group consisting of
(i) a compound of the formula $$GeX_4$$

wherein X represents H, F, Cl, Br or I;
(ii) crystalline germanium dioxide;
(iii) a compound of the formula $$R_4Ge$$

wherein R represents an alkyl, aryl, aralkyl, alkoxy, aryloxy or aralkyloxy group of 1–10 carbon atoms;

(iv)

$$\begin{matrix} H_2C-O & & O-CH_2 \\ & \diagdown \diagup & \\ & Ge & \\ & \diagup \diagdown & \\ H_2C-O & & O-CH_2 \end{matrix} \;;\text{ and}$$

(v)

$$\begin{matrix} H_2C-O & \\ & \diagdown \\ & Ge(OCH_2CH_2OH)_2; \\ & \diagup \\ H_2C-O & \end{matrix}$$

(B) 0.5–5.0 molar times, calculated as an alkali metal, based on the mol number of said germanium in the germanium compound of an alkaline substance selected from the group consisting of alkali metals, and hydrides, hydroxides, oxides, alcoholates, and inorganic and organic acid salts of alkali metals;

(C) 0.001 to 1% by weight of, calculated as phosphorus atom, based on the terephthalic acid component of said bis($\beta$-hydroxyethyl)terephthalate, a phosphorus compound selected from the group consisting of phosphorus oxy acids; phosphorus oxy acid salts, halides and oxyhalides of phosphorus; esters of the formula $$R''O-\underset{\underset{OR''}{|}}{\overset{\overset{O}{\|}}{P}}-OR'' \text{ and } R''O-\overset{\overset{O}{\|}}{\underset{\underset{OR''}{|}}{P}}-OR''$$

wherein R'' represents hydrogen or alkyl, aryl or aralkyl group of 1–18 carbon atoms, provided that at least one R'' is a group other than hydrogen; derivatives of the formulae $$R''-\underset{\underset{OR'''}{|}}{\overset{\overset{O}{\|}}{O}}-OR''', \; R''-\overset{\overset{O}{\|}}{P}-OR'''$$

$$R''-\underset{\underset{R''}{|}}{\overset{\overset{O}{\|}}{P}}-R'' \text{ and } R''-\overset{\overset{O}{\|}}{\underset{\underset{R''}{|}}{P}}-R''$$

wherein R'' has the same meaning as defined above, and R''' is selected from hydrogen, alkali metals, and alkyl, aryl, and aralkyl groups of 1–10 carbon atoms; and phosphoryl amides of the formula $$R''N-\underset{\underset{NR''}{|}}{\overset{\overset{O}{\|}}{P}}-NR''$$

wherein R'' has the same meaning as defined above; and (D) a glycol selected from the group consisting of ethylene glycol, diethylene glycol, and propylene glycol.

2. The process of claim 1, wherein the alkali metal of said alkaline substance is selected from the group consisting of lithium, sodium, and potassium.

3. The process of claim 1, wherein said alkaline substance is an alkali metal.

4. A process for the preparation of a film and fiber-forming polyester in which at least 80% of the recurring structural units are composed of ethylene terephthalate units, which comprises polycondensing bis($\beta$-hydroxyethyl)terephthalate, or a mixture of bis($\beta$-hydroxyethyl)terephthalate and at least one comonomer which is copolycondensable with said bis($\beta$-hydroxyethyl)terephthalate, said bis($\beta$-hydroxyethyl)terephthalate being present in said mixture in a quantity sufficient to yield at least 80% ethylene terephthalate units in said film and fiber-forming polyester, in a reaction medium consisting essentially of a solution obtained by admixing (A) 0.003 to 1% by weight of, calculated as germanium, based on the terephthalic acid component of said bis($\beta$-hydroxyethyl)terephthalate, crystalline germanium dioxide;

(B) 0.5–5.0 molar times, calculated as an alkali metal, of the mol number of the germanium in the germanium compound, of an alkaline substance selected from the group consisting of alkali metals, and hydrides, hydroxides, oxides, alcoholates, and inorganic and organic acid salts of alkali metals;

(C) 0.001 to 1% by weight of, calculated as phosphorus atom, based on the terephthalic acid component of said bis($\beta$-hydroxyethyl)terephthalate, a phosphorus compound selected from the group consisting of phosphorus oxy acids; phosphorus oxy acid salts; halides and oxyhalides of phosphorus; esters of the formulae $$R''O-\underset{\underset{OR''}{|}}{\overset{\overset{O}{\|}}{P}}-OR'' \text{ and } R''O-\overset{\overset{O}{\|}}{\underset{\underset{OR''}{|}}{P}}-OR''$$

wherein R'' represents hydrogen or alkyl, aryl or aralkyl group of 1–18 carbon atoms, provided that at least one R'' is a group other than hydrogen; derivatives of the formulae $$R''-\underset{\underset{OR'''}{|}}{\overset{\overset{O}{\|}}{O}}-OR''', \; R''-\overset{\overset{O}{\|}}{P}-OR'''$$

$$R''-\underset{\underset{R''}{|}}{\overset{\overset{O}{\|}}{P}}-R'' \text{ and } R''-\overset{\overset{O}{\|}}{\underset{\underset{R''}{|}}{P}}-R''$$

wherein R'' has the same meaning as defined above, and R''' is selected from hydrogen, alkali metals, and alkyl, aryl, and aralkyl groups of 1–10 carbon atoms; and phosphoryl amides of the formula $$R''N-\underset{\underset{NR''}{|}}{\overset{\overset{O}{\|}}{P}}-NR''$$

wherein R'' has the same meaning as defined above; and (D) a glycol selected from the group consisting of ethylene glycol, diethylene glycol, and propylene glycol.

5. The process of claim 1, wherein said admixture is present in the state of a solution.

6. The process of claim 5, wherein said solution is added to the reaction system before initiation of the polycondensation.

7. The process of claim 5, wherein said solution is added to the reaction system during the polycondensation.

8. The process of claim 5, wherein said solution is added to the reaction system as more than one divided portion before completion of the polycondensation, the addition of second and subsequent fractions being effected at the time when the average degree of polymerization of the product polyester reaches 15–80% of the ultimately desired average degree of polymerization.

9. A process for the preparation of a film and fiber-forming polyester in which at least 80% of the recurring structural units are composed of ethylene terephthalate units, which comprises polycondensing bis($\beta$-hydroxyethyl)terephthalate, or a mixture of bis($\beta$-hydroxyethyl) terephthalate and at least one comonomer which is copolycondensable with said bis(β-hydroxyethyl)terephthalate, said bis(β-hydroxyethyl)terephthalate being present in said mixture in a quantity sufficient to yield at least 80% ethylene terephthalate in said film and fiber-forming polyester, in a reaction medium, consisting essentially of an admixture of (A) 0.003 to 1% by weight of, calculated as germanium, based on the terephthalic acid component of said bis(β-hydroxyethyl)terephthalate, a tetravalent germanium compound selected from the group consisting of
  (i) a compound of the formula

    GeX$_4$ wherein X represents H, F, Cl, Br or I;
  (ii) crystalline germanium dioxide;
  (iii) a compound of the formula

    R$_4$Ge wherein R represents an alkyl, aryl, aralkyl, alkoxy, aryloxy or aralkyloxy group of 1–10 carbon atoms;
  (iv)

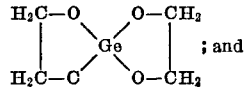

(v)

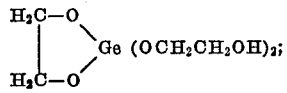

(B) 0.5–5.0 molar times, calculated as an alkali metal, of the mol number of the germanium in the germanium compound, of an alkali metal alcoholate of an alcohol of the formula R'OH in which R' is selected from the group consisting of —CH$_3$, —C$_2$H$_5$, —C$_3$H$_7$, —C$_4$H$_9$, —CH$_2$CH$_2$OH,

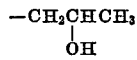

—CH$_2$CH$_2$OM in which M represents an alkali metal, and —CH$_2$C$_6$H$_5$;

(C) 0.001 to 1% by weight of, calculated as phosphorus atom, based on the terephthalate acid component of said bis(β-hydroxyethyl)terephthalate, a phosphorus compound selected from the group consisting of phosphorus oxy acids; phosphorus oxy acid salts; halides and oxyhalides of phosphorus; esters of the formulae

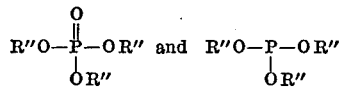

wherein R″ represents hydrogen or alkyl, aryl or aralkyl group of 1–18 carbon atoms, provided that at least one R″ is a group other than hydrogen; derivatives of the formulae

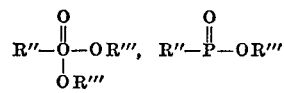

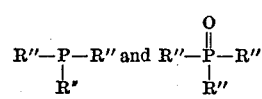

wherein R″ has the same meaning as defined above, and R‴ is selected from hydrogen, alkali metals, and alkyl, aryl, and aralkyl groups of 1–10 carbon atoms; and phosphoryl amides of the formula

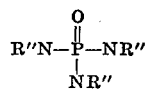

wherein R″ has the same meaning as defined above; and (D) a glycol selected from the group consisting of ethylene glycol, diethylene glycol, and propylene glycol.

10. A process for the preparation of a film and fiber-forming polyester in which at least 80% of the recurring structural units are composed of ethylene terephthalate units, which comprises polycondensing bis(β-hydroxyethyl)terephthalate, or a mixture of bis(β-hydroxyethyl)terephthalate and at least one comonomer which is copolycondensable with said bis(β-hydroxyethyl)terephthalate, said bis(β-hydroxyethyl)terephthalate being present in said mixture in a quantity sufficient to yield at least 80% ethylene terephthalate units in said film and fiber-forming polyester, in the reaction medium, consisting essentially of an admixture of (A) 0.003 to 1% by weight of, calculated as germanium, based on the terephthalic acid component constituting the bis(β-hydroxyethyl)terephthalate, a tetravalent germanium compound selected from the group consisting of
  (i) a compound of the formula

    GeX$_4$ wherein X represents H, F, Cl, Br or I;
  (ii) crystalline germanium dioxide;
  (iii) a compound of the formula

    R$_4$Ge wherein R represents alkyl, aryl, aralkyl, alkoxy, aryloxy or aralkyloxyl group of 1–10 carbon atoms;
  (iv)

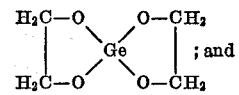

(v)

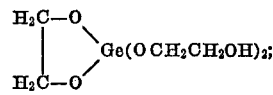

(B) 0.5–5.0 molar times, calculated as an alkali metal, of the mol number of the germanium in the germanium compound, of an alkaline substance selected from the group consisting of carbonates, bicarbonate, acetates and benzoates of alkali metals;

(C) 0.001 to 1% by weight of, calculated as phosphorus atom, based on the terephthalate acid component of said bis(β-hydroxyethyl)terephthalate, a phosphorus compound selected from the group consisting of phosphorus oxy acids; phosphorus oxy acid salts; halides and oxyhalides of phosphorus; esters of the formulae

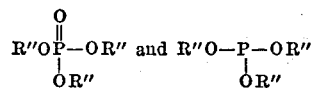

wherein R″ represents hydrogen or alkyl, aryl or aralkyl group of 1–18 carbon atoms, provided that at least one R″ is a group other than hydrogen; derivatives of the formulae

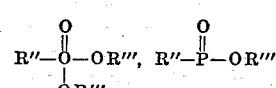

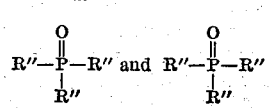

wherein R″ has the same meaning as defined above, and R‴ is selected from hydrogen, alkali metals, and alkyl, aryl, and aralkyl groups of 1–10 carbon atoms; and phosphoryl amides of the formula

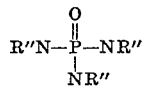

wherein R" has the same meaning as defined above; and (D) a glycol selected from the group consisting of ethylene glycol, diethylene glycol, and propylene glycol.

References Cited

UNITED STATES PATENTS

| | | | |
|---|---|---|---|
| 3,074,913 | 1/1963 | Davies et al. | 260—75 |
| 3,377,320 | 4/1968 | Zoetbrood | 260—75 |
| 3,412,066 | 11/1968 | Schnegg et al. | 260—75 |
| 3,459,711 | 8/1969 | Hartmann et al. | 260—75 |

FOREIGN PATENTS 1,503,038  10/1967  France _____ 260—75 P

OTHER REFERENCES

Netherlands Application 6606830, Nov. 21, 1966, Kaisha, pp. 1–15.

WILLIAM H. SHORT, Primary Examiner

L. P. QUAST, Assistant Examiner

U.S. Cl. X.R.

252—429 R, 430, 431 R; 260—47 C, 75 P, 429 R

UNITED STATES PATENT OFFICE
CERTIFICATE OF CORRECTION

S-298

Patent No. 3,651,017      Dated March 21, 1972

Inventor(s) TANABE ET AL

It is certified that error appears in the above-identified patent and that said Letters Patent are hereby corrected as shown below:

Page 3, column 6, line 18, delete "$Ge(C_2HH_5)_4$" and insert -- $Ge(C_2H_5)_4$ --.

Page 5, the column 10, lines 70 - 74, delete the formula " $R'' - \underset{R}{\overset{O}{\underset{|}{PP}}} - R''$ " and insert the formula -- $R'' - \underset{R''}{\overset{O}{\underset{|}{\overset{\|}{P}}}} - R''$ --.

Page 12, column 24, Claim 10 (C) lines 65-73, in the third formula, delete "$\overset{O}{\|}$", which is above the "P".

Signed and sealed this 1st day of August 1972.

(SEAL)
Attest:

EDWARD M. FLETCHER, JR.      ROBERT GOTTSCHALK
Attesting Officer      Commissioner of Patents